Nov. 7, 1933.   C. H. HAWKINSON   1,934,536
FISHING APPARATUS
Filed Dec. 19, 1932
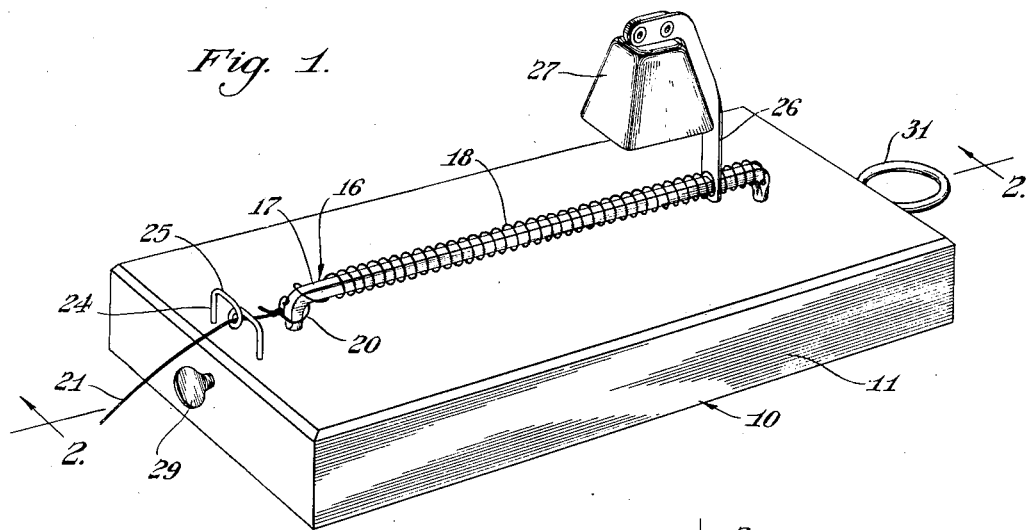
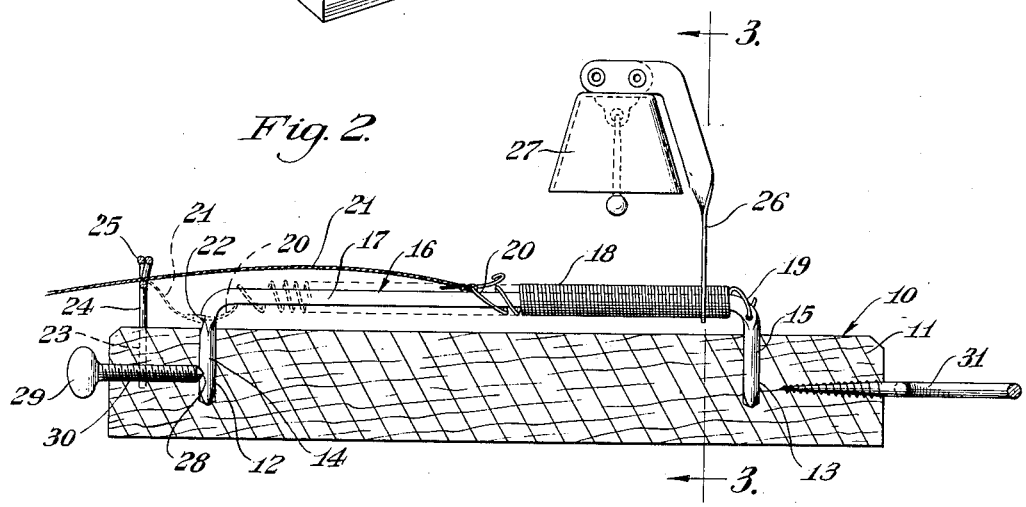
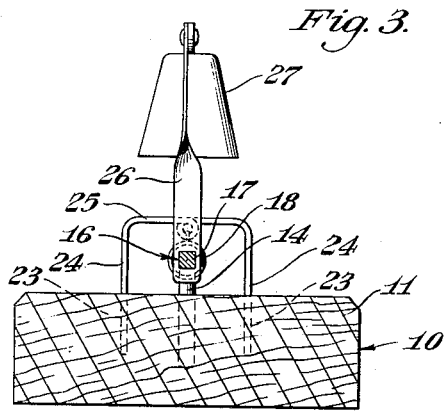
Charles H. Hawkinson,
INVENTOR
BY Victor J. Evans & Co.
HIS ATTORNEYS Patented Nov. 7, 1933

1,934,536

UNITED STATES PATENT OFFICE 1,934,536

FISHING APPARATUS

Charles H. Hawkinson, Chicago, Ill.

Application December 19, 1932
Serial No. 647,987

4 Claims. (Cl. 43—16)

This invention relates to certain novel improvements in fishing apparatus.

This invention relates to that type of fishing apparatus in which the bait hook and line, when pulled by the fish, operate a trigger, thereby releasing a spring attached to the line so as to jerk the hook suddenly and sink the same in the jaw of the fish; and objects of the invention are: to provide an apparatus that acts instantaneously, when the fish bites, to set the hook in the jaw of the fish; to provide an apparatus which may be collapsed, when not in use, and readily packed in a fisherman's bag or kit; and which may be readily set up in operative position ready for use.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view of the new apparatus set up in operative position;

Fig. 2 is a longitudinal sectional view on line 2—2 in Fig. 1; and

Fig. 3 is a transverse sectional view on line 3—3 in Fig. 2.

The new apparatus is generally indicated at 10 and comprises a base 11 having a pair of spaced apertures 12 and 13 formed therein. Removably mounted in these apertures 12 and 13 of the base 11 are the arms 14 and 15, respectively, of a substantially U-shaped member 16 which includes a rod-like bight portion 17 that interconnects the arms 14 and 15.

Mounted on the rod-like bight portion 17 of the member 16 is a coil spring 18 which has one end winding attached to the arm 15, as at 19. Attached to the other end winding 20 of the spring 18 is the flexible fishing line 21 adapted to carry a hook (not shown). Formed in the arm 14 of member 16 is a latching detent 22.

Removably mounted in a pair of spaced openings 23 formed in base 11 are arms 24 of a guide 25 for the fishing line 21.

The portion 17 of member 16 is preferably made of square stock (Fig. 3) and mounted thereon is a supporting arm 26 which carries an audible signal in the form of a bell 27.

Formed in the arm 14 of member 16 is a detent or recess 28 (Fig. 2) and adapted to engage in this recess 28 so as to latch the member 16 to the base 11 is a latching set screw 29 which is adjustably mounted in a threaded opening 30 formed in the base 11.

A ring 31 is secured to the base 11. A stake or pin (not shown) may be driven through this ring 31 into the ground so as to secure the apparatus in a fixed position, when fishing from the shore of a body of water, or when fishing from a boat the apparatus may be secured thereto by attaching a string or chain to the boat and to the ring 31.

To set the device in operative position arms 14 and 15 of member 16 are inserted into the apertures 12 and 13, respectively, of the base 11 and the set screw 29 is screwed up to disposed the inner end portion thereof in the detent 28; thereby latching the member 16 to the base 11.

The trigger coil spring 18 is then expanded, into the full line position of Fig. 1, (dotted line position of Fig. 2) and the end winding 20 thereof is then engaged in the detent 22; thus latching the trigger coil spring 18 in tensioned position.

When a fish bites the hook on line 21 the pull exerted by the fish on the line 21 disengages the end winding 20 of the tensioned trigger spring from the latching detent 22, and the spring thus released immediately contracts into the full line position of Fig. 2, thus exerting a sudden and instantaneous jerk on the line 21 which sinks the hook in the jaws of the fish. At the same time the rapid contraction of the spring vibrates the arm 26 and rings the warning bell 27.

The apparatus may be collapsed for packing in a small kit or bag by manipulating the set screw 29 to unlatch the inner end portion thereof from the detent 28; then pulling the arms 14 and 15 up out of the holes 12 and 13; and finally pulling the arms 24 up out of the holes 23 in the base 11.

Having thus described my invention what I claim as new and desire to protect by Letters Patent is:

1. Fishing apparatus, comprising a fishing line, a base, a U-shaped member on said base including a pair of spaced arms anchored in said base and including a rod-like portion extended between said arms, one of said arms having a detent formed therein, a coil trigger spring having said rod-like portion extended therethrough, said spring having one end thereof fixed relative to said U-shaped member and having its other end latchable in extended position to said detent and attached to said fishing line.

2. Fishing apparatus, comprising a fishing line, a base, a member having a pair of spaced arms mounted in said base and including a rod-like portion extending between said arms above the base, and a coil trigger spring having said rod-like portion extended therethrough and having one end fixed relative to said member, one of said arms having a latching detent formed therein and said spring having its other end latchable in extended position to said detent and attached to said fishing line.

3. Fishing apparatus, comprising a fishing line, a base having a pair of spaced apertures formed therein, a member having a pair of spaced arms receivable in said apertures and including a rod-like portion extending between said arms, a coil trigger spring having said rod-like portion extended therethrough and having an end portion fixed to said member, one of said arms having a latching detent formed therein, said spring having its other end latchable in extended position to said detent and attached to said line, and a latching set screw adjustably mounted in said base having a portion engageable with one of said arms to latch said member to said base.

4. In a fishing apparatus, the combination of a base, a trigger coil spring, a fishing line attached to one end of the spring, and a U-shaped member mounted on the base having a portion thereof extended above said base through said spring and including an arm having a latching portion engageable with the other end of said spring to hold the spring in extended, tensioned position.

CHARLES H. HAWKINSON.